(12) United States Patent
Zahka

(10) Patent No.: US 10,709,296 B2
(45) Date of Patent: Jul. 14, 2020

(54) BACKSPLASH COVERING ASSEMBLY

(71) Applicant: Marissa Zahka, Plymouth, MI (US)

(72) Inventor: Marissa Zahka, Plymouth, MI (US)

( * ) Notice: Subject to any disclaimer, the term of this patent is extended or adjusted under 35 U.S.C. 154(b) by 0 days.

(21) Appl. No.: 16/124,381

(22) Filed: Sep. 7, 2018

(65) Prior Publication Data

US 2020/0077844 A1 Mar. 12, 2020

(51) Int. Cl.
*E03C 1/181* (2019.01)
*A47J 47/20* (2019.01)

(52) U.S. Cl.
CPC ............... *A47J 47/20* (2013.01); *E03C 1/181* (2013.01)

(58) Field of Classification Search
CPC ........... A47J 47/20; E03C 1/181; E03C 1/186
USPC ............................................................ 4/658
See application file for complete search history.

(56) References Cited

U.S. PATENT DOCUMENTS

| | | | |
|---|---|---|---|
| 2,635,253 A * | 4/1953 | Kirvay | ..................... E03C 1/186 4/658 |
| 2,692,991 A | 11/1954 | Church | |
| 2,762,062 A | 9/1956 | Barton | |
| 4,722,103 A | 2/1988 | Kliebert | |
| D325,249 S | 4/1992 | Kliebert | |
| 6,212,708 B1 | 4/2001 | Mulaw | |
| D474,055 S * | 5/2003 | Brewster | ......................... D6/707 |
| 6,647,899 B1 * | 11/2003 | Lysien | ................... A47B 13/00 108/24 |
| 8,214,939 B2 | 7/2012 | Spurlock | |
| 8,393,022 B2 * | 3/2013 | Dachowski | ............ A61C 17/14 4/263 |
| 2013/0196146 A1 | 8/2013 | Yu | |

FOREIGN PATENT DOCUMENTS

WO    WO2013116401    8/2013

* cited by examiner

*Primary Examiner* — Huyen D Le

(57) ABSTRACT

A backsplash covering assembly for protecting grout in a backsplash includes a countertop that has a sink therein and a wall that intersects the countertop behind the sink. A splash guard is positioned at an intersection between the countertop and the sink. The splash guard is comprised of a fluid impermeable material to inhibit water from reaching the intersection. The splash guard is positioned behind the sink to protect the appearance of the grout in the intersection. Additionally, the splash guard is comprised of a translucent material such that the grout is visible through the splash guard.

4 Claims, 4 Drawing Sheets

BACKSPLASH COVERING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to covering devices and more particularly pertains to a new covering device for protecting grout in a backsplash.

BRIEF SUMMARY OF THE INVENTION

An embodiment of the disclosure meets the needs presented above by generally comprising a countertop that has a sink therein and a wall that intersects the countertop behind the sink. A splash guard is positioned at an intersection between the countertop and the sink. The splash guard is comprised of a fluid impermeable material to inhibit water from reaching the intersection. The splash guard is positioned behind the sink to protect the appearance of the grout in the intersection. Additionally, the splash guard is comprised of a translucent material such that the grout is visible through the splash guard.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
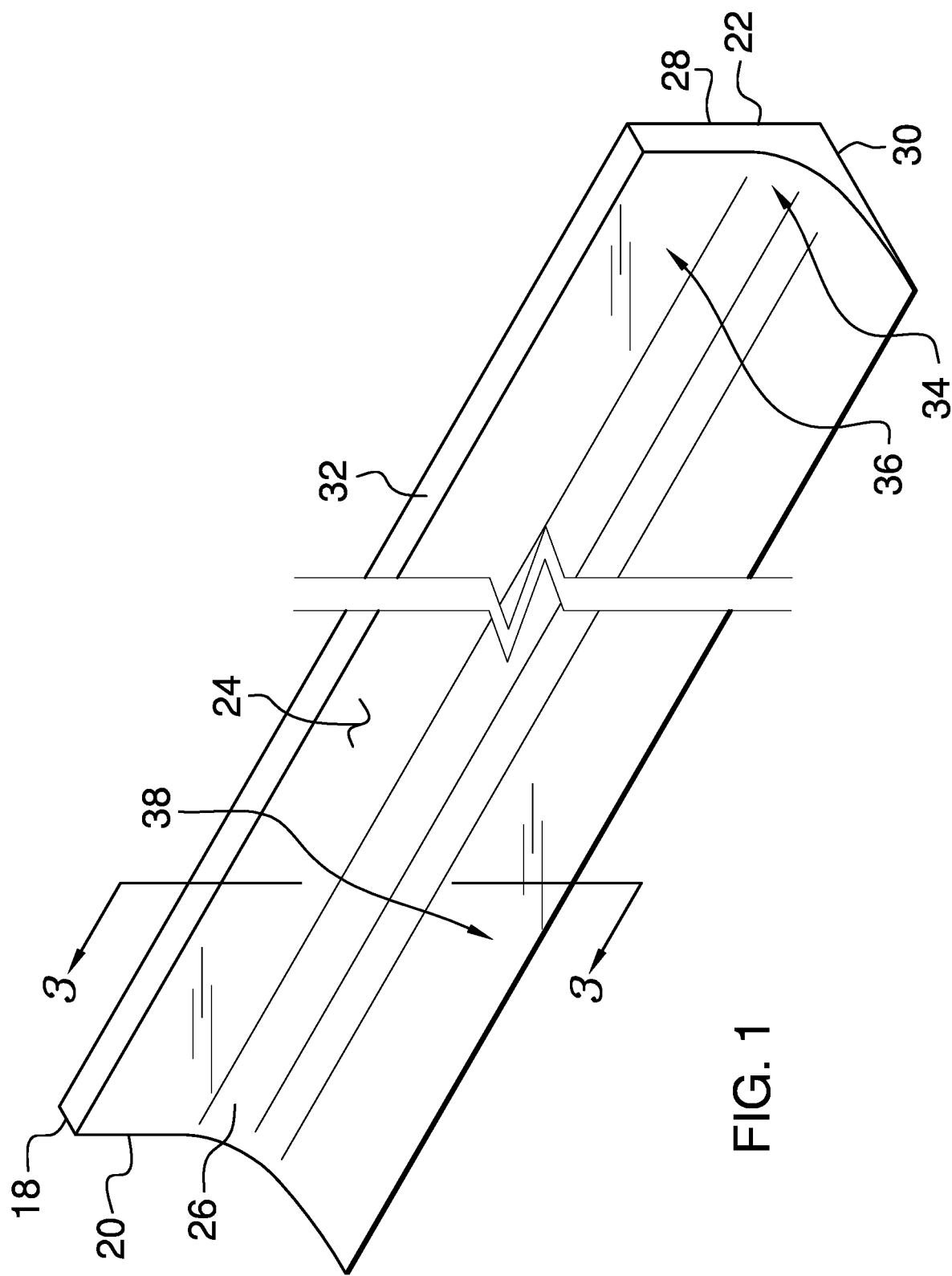
FIG. 1 is a front perspective view of splash guard of a backsplash covering assembly according to an embodiment of the disclosure.
Figure 2:
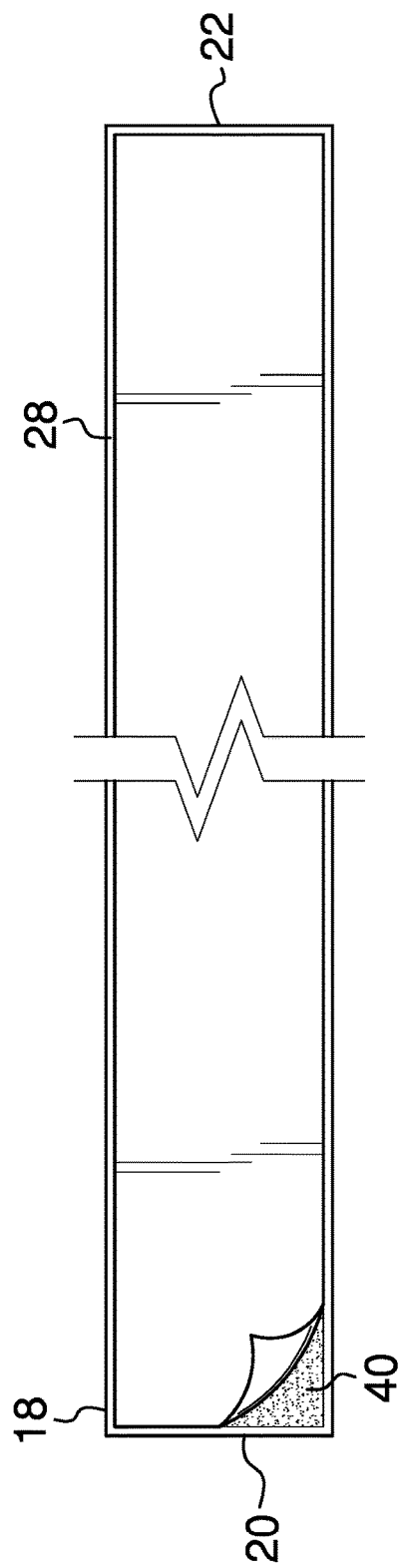
FIG. 2 is a back view of splash guard of an embodiment of the disclosure.
Figure 3:
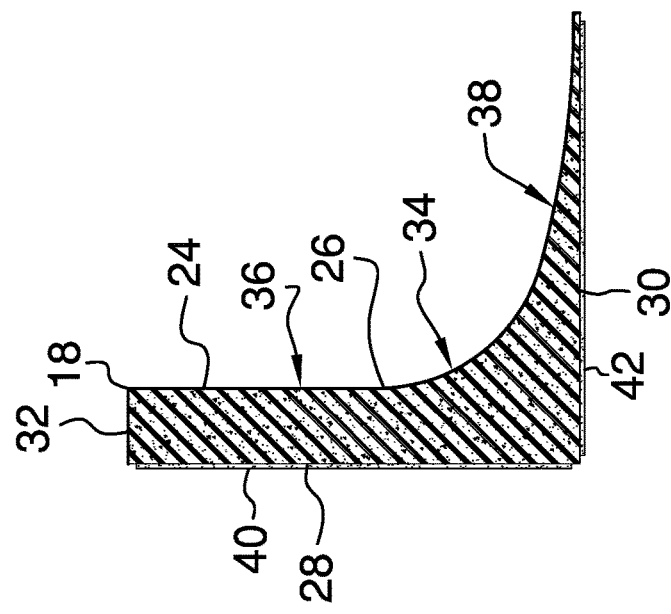
FIG. 3 is a cross sectional view taken along line 3-3 of FIG. 1 of an embodiment of the disclosure.
Figure 4:
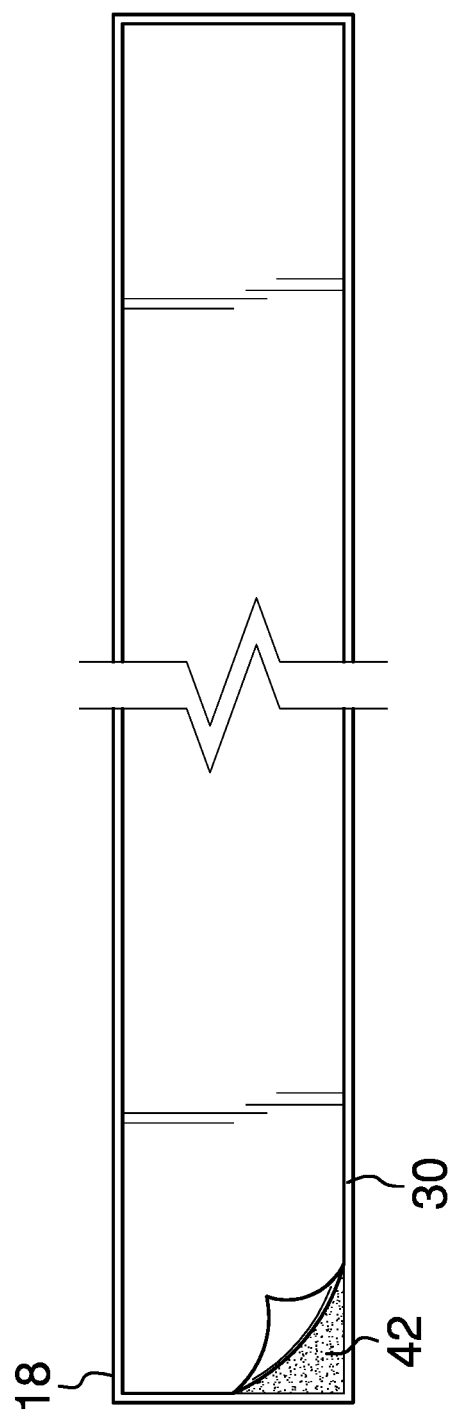
FIG. 4 is a bottom view of splash guard of an embodiment of the disclosure.
Figure 5:
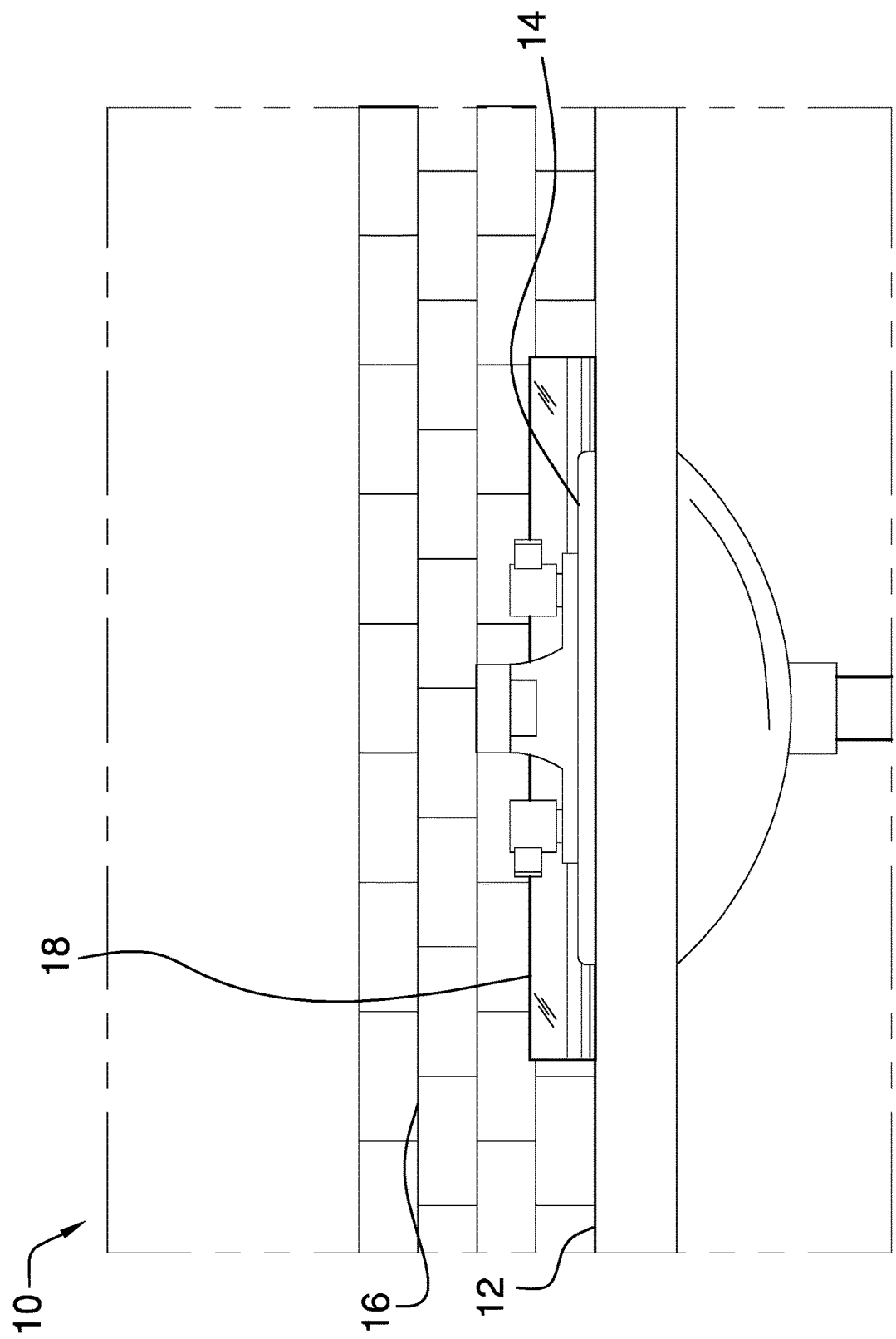
FIG. 5 is a perspective in-use view of an embodiment of the disclosure.

With reference now to the drawings, and in particular to FIGS. 1 through 5 thereof, a new covering device embodying the principles and concepts of an embodiment of the disclosure and generally designated by the reference numeral 10 will be described.

As best illustrated in FIGS. 1 through 5, the backsplash covering assembly 10 generally comprises a countertop 12 has a sink 14 therein and a wall 16 that intersects the countertop 12 behind the sink 14. Each of the countertop 12, the wall 16 and the sink 14 may be elements of a kitchen in a house or other type of building. A splash guard 18 is provided and the splash guard 18 is positioned at an intersection between the countertop 12 and the sink 14. The splash guard 18 is comprised of a fluid impermeable material to inhibit water from reaching the intersection. Moreover, the splash guard 18 is positioned behind the sink 14 to enhance the appearance of the grout in the intersection. The splash guard 18 is comprised of a translucent material such that the grout is visible through the splash guard 18.

The splash guard 18 has a first end 20, a second end 22 and an outer surface 24 extending therebetween, and the splash guard 18 is elongated between the first 20 and second 22 ends. The outer surface 24 has a front side 26, a back side 28, a bottom side 30 and a top side 32, and the back side 28 is oriented perpendicular to each of the top 32 and bottom 30 sides. The back side 28 is positioned against the wall 16 and the bottom side 30 is positioned against the countertop 12.

The front side 26 has a curve 34 therein extending inwardly toward an intersection between the bottom side 30 and the back side 28. Thus, the curve 34 defines a vertical portion 36 of the front side 26 and a horizontal portion 38 of the front side 26. The vertical portion 36 extends downwardly from the top side 32 having the vertical portion 36 being oriented collinear with the back side 28. The horizontal portion 38 slopes downwardly toward the bottom side 30 to direct water to flow onto the countertop 12 when the water is splashed onto the splash guard 18. Additionally, the splash guard 18 may have a length that corresponds to a width of the sink 14.

A back mating member 40 is coupled to the splash guard 18 and the back mating member 40 engages the wall 16 to retain the splash guard 18 against the wall 16. The back mating member 40 is positioned on the back side 28 of the outer surface 24 of the splash guard 18. Additionally, the back mating member 40 comprises a fluid resistant adhesive strip and fluid resistant adhesive strip may include a protective sheet. A bottom mating member 42 is coupled to the splash guard 18 and the bottom mating member 42 engages the countertop 12 to retain the splash guard 18 on the countertop 12. The bottom mating member 42 is positioned on the bottom side 30 of the outer surface 24 of the splash guard 18. The bottom mating member 42 comprises a fluid resistant adhesive strip that includes a protective sheet.

In use, the splash guard 18 is positioned behind the sink 14 at the intersection between the countertop 12 and the wall 16. Thus, the splash guard 18 inhibits water that splashes out of the sink 14 from contacting grout between the countertop 12 and the wall 16. In this way the grout is protected from being stained or cracked due to continuous contact with water. Thus, the splash guard 18 not only enhances the appearance of the grout in existing backsplashes, the splash guard 18 additionally extends the service life of the grout in the existing backsplashes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A backsplash covering assembly for protecting grout in a backsplash from damage and discoloration, said assembly comprising:
   a countertop having a sink therein;
   a wall intersecting said countertop behind said sink; and
   a splash guard being positioned at an intersection between said countertop and said sink, said splash guard being comprised of a fluid impermeable material wherein said splash guard is configured to inhibit water from reaching said intersection, said splash guard being positioned behind said sink directly against said countertop and said wall wherein said splash guard is configured to protect the grout in said intersection, said splash guard being comprised of a translucent material such that said grout is visible through said splash guard, said splash guard having a first end, a second end and an outer surface extending therebetween, said splash guard being elongated between said first and second ends, said outer surface having a front side, a back side, a bottom side and a top side, said back side being oriented perpendicular to each of said top and bottom sides, said back side being positioned against said wall, said bottom side being positioned against said countertop, said front side having a curve therein extending inwardly toward an intersection between said bottom side and said back side to define a vertical portion of said front side and a horizontal portion of said front side, said vertical portion extends downwardly from said top side having said vertical portion being oriented collinear with said back side, said horizontal portion sloping downwardly toward said bottom side wherein said horizontal portion is configured to direct water to flow onto said countertop when the water is splashed onto said splash guard.

2. The assembly according to claim 1, further comprising a back mating member being coupled to said splash guard, said back mating member engaging said wall to retain said splash guard against said wall, said back mating member being positioned on said back side of said outer surface of said splash guard, said back mating member comprising a fluid resistant adhesive strip.

3. The assembly according to claim 1, further comprising a bottom mating member being coupled to said splash guard, said bottom mating member engaging said countertop to retain said splash guard on said countertop, said bottom mating member being positioned on said bottom side of said outer surface of said splash guard, said bottom mating member comprising a fluid resistant adhesive strip.

4. A backsplash covering assembly for protecting grout in a backsplash from damage and discoloration, said assembly comprising:
   a countertop having a sink therein;
   a wall intersecting said countertop behind said sink;
   a splash guard being positioned at an intersection between said countertop and said sink directly against said countertop and said wall, said splash guard being comprised of a fluid impermeable material wherein said splash guard is configured to inhibit water from reaching said intersection, said splash guard being positioned behind said sink wherein said splash guard is configured to enhance the appearance of the grout in said intersection, said splash guard being comprised of a translucent material such that said grout is visible through said splash guard, said splash guard having a first end, a second end and an outer surface extending therebetween, said splash guard being elongated between said first and second ends, said outer surface having a front side, a back side, a bottom side and a top side, said back side being oriented perpendicular to each of said top and bottom sides, said back side being positioned against said wall, said bottom side being positioned against said countertop, said front side having a curve therein extending inwardly toward an intersection between said bottom side and said back side to define a vertical portion of said front side and a horizontal portion of said front side, said vertical portion extending downwardly from said top side having said vertical portion being oriented collinear with said back side, said horizontal portion sloping downwardly toward said bottom side wherein said horizontal portion is configured to direct water to flow onto said countertop when the water is splashed onto said splash guard;
   a back mating member being coupled to said splash guard, said back mating member engaging said wall to retain said splash guard against said wall, said back mating member being positioned on said back side of said outer surface of said splash guard, said back mating member comprising a fluid resistant adhesive strip; and
   a bottom mating member being coupled to said splash guard, said bottom mating member engaging said countertop to retain said splash guard on said countertop, said bottom mating member being positioned on said bottom side of said outer surface of said splash guard, said bottom mating member comprising a fluid resistant adhesive strip.

* * * * *